(12) United States Patent
Glatthaar et al.

(10) Patent No.: US 8,340,879 B2
(45) Date of Patent: Dec. 25, 2012

(54) METHOD FOR ACTIVATING A CLUTCH ARRANGEMENT

(75) Inventors: Josef Glatthaar, Oberndorf (DE); Stefan Thum, Planegg (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 661 days.

(21) Appl. No.: 12/496,377

(22) Filed: Jul. 1, 2009

(65) Prior Publication Data
US 2010/0004092 A1   Jan. 7, 2010

(30) Foreign Application Priority Data
Jul. 1, 2008   (DE) .................. 10 2008 032 245

(51) Int. Cl.
*G06F 7/00* (2006.01)
*F16H 61/688* (2006.01)

(52) U.S. Cl. .................. 701/67; 477/109

(58) Field of Classification Search .......... 701/87, 701/95, 67, 8; 477/109, 77, 39, 176, 115, 477/86; 192/30 R, 70.27, 84.6, 20, 85.6; 123/179.3; 180/338; 74/340; 475/269, 317
See application file for complete search history.

(56) References Cited

U.S. PATENT DOCUMENTS

| | | | | |
|---|---|---|---|---|
| 5,403,250 | A * | 4/1995 | Juergens | 477/176 |
| 7,021,422 | B2 * | 4/2006 | Busold et al. | 192/48.602 |
| 2004/0038776 | A1 * | 2/2004 | Kuhstrebe et al. | 477/77 |
| 2004/0074732 | A1 * | 4/2004 | Busold et al. | 192/87.13 |
| 2005/0197233 | A1 * | 9/2005 | Hoshiya et al. | 477/39 |
| 2007/0289808 | A1 * | 12/2007 | Yasui et al. | 180/446 |

FOREIGN PATENT DOCUMENTS

| | | |
|---|---|---|
| DE | 101 50 597 A1 | 4/2003 |
| DE | 103 52 611 A1 | 6/2005 |
| DE | 10 2005 034 522 A1 | 3/2006 |
| DE | 10 2006 030 142 A1 | 1/2008 |
| DE | 102006030142 * | 1/2008 |

* cited by examiner

*Primary Examiner* — Thomas Black
*Assistant Examiner* — Marthe Marc-Coleman
(74) *Attorney, Agent, or Firm* — Knobbe, Martens, Olson & Bear, LLP

(57) ABSTRACT

A method for opening a closed clutch arrangement of a drivetrain for a motor vehicle. The clutch arrangement is activated in such a way that the torque which it can transmit is reduced up to an opening point at which torque can no longer be transmitted via the clutch arrangement. The clutch arrangement is placed into an intermediate slip state before the opening point is reached.

12 Claims, 4 Drawing Sheets

METHOD FOR ACTIVATING A CLUTCH ARRANGEMENT

CROSS REFERENCE TO RELATED APPLICATIONS

This application claims the priority of German patent application DE 10 2008 032 245, filed Jul. 1, 2008.

BACKGROUND OF THE INVENTION

The present invention relates to a method for opening a closed clutch arrangement of a drivetrain for a motor vehicle.

Methods of said type serve for carrying out a gearchange, in particular in a dual-clutch transmission, in as jerk-free a manner as possible.

Motor vehicles having an automatically actuated clutch and transmissions are generally known. During a gearchange, the automatic clutch interrupts the power flow between the engine and the drive wheels and conventionally operates with a high level of comfort, since said automatic clutch opens and closes in a comparatively smooth manner. In the case of automatic multi-step transmissions, use is also made of dual-clutch transmissions with two parallel separating clutches, with an interruption in tractive force being prevented in that, in the time overlap, a gear which is connected to a first separating clutch is disengaged and, at the same time, another gear is engaged by means of a second separating clutch.

A smooth opening and closing of the two separating clutches in order to prevent a shift jerk leads to long shift processes. A shortening of the shift duration by means of accelerated opening and closing of the separating clutches conventionally leads to a shift jerk and therefore to a less comfortable shift behaviour.

A precise gearchange by means of a time-overlapping opening and closing of two clutches requires a precise determination of an opening point of the clutch to be opened. Since the clutch is acted on with a permanently alternating engine torque, a precise determination of the opening point is difficult.

DE 101 50 597 A1 describes a method in which dead times during the actuation of the clutch arrangement are prevented, or the shift times are reduced, in that the clutch arrangement is held in such an actuating state that the torque which it can transmit corresponds to, or is slightly lower than, a torque output by the drive unit.

This means that the clutch is operated close to the opening point and is therefore permanently in a slip state, that is to say that the input rotational speed of the clutch is higher (in traction operation) or lower (in overrun operation) than the output rotational speed. Said state is referred to as micro-slip.

A disadvantage here is that the permanently slipping clutch leads to power losses in the drivetrain.

Furthermore, in the method from DE 10 150 597 A1, the correlation of the clutch pressure to the transmitted clutch torque is determined on the basis of characteristic maps. Said value pairs are determined on the basis of the slipping clutch. Said value pairs are however not necessarily current, such that the shift process can be initiated only with a small amount of precision.

BRIEF SUMMARY OF THE INVENTION

The invention is therefore based on the object of providing a method for activating a clutch arrangement in which the power loss is reduced and, at the same time, a harmonic transfer of torque is possible during a gearchange without an interruption in tractive force.

Said object is achieved by means of a method as specified in the introduction, in which the torque which can be transmitted by the clutch arrangement is reduced up to an opening point at which torque can no longer be transmitted via the clutch arrangement, and wherein the clutch arrangement is placed into an intermediate slip state before the opening point is reached.

In this way, a pressure which is applied to the clutch arrangement can be set in relation to the transmissible torque.

Since the clutch arrangement is completely closed between the shift processes, no slip-induced losses occur. Since the clutch is placed into an intermediate slip state before each individual shift process, a value pair composed of the applied pressure and transmissible torque can be determined in a precise and current fashion.

The method according to the invention can be used in friction clutches of countershaft transmissions and also of automatic shift transmissions or dual-clutch transmissions. The method according to the invention may equally be used in automatic transmissions with conventional planetary gear sets, in which the gears are permanently engaged and which have a converter with a clutch which is activated according to the invention.

The clutches which are activated according to the invention may be wet-running clutches such as wet-running multiplate clutches. The clutches may however also be dry-running clutches.

In the present case, any reference to a clutch pressure is likewise intended to refer to a clutch force which is used as a state variable for example in a non-hydraulic or dry actuator arrangement (such as for example of an electromechanical or electromagnetic actuator arrangement).

The object is thereby achieved in its entirety.

In the method according to the invention, it is advantageous if the torque which can be transmitted by the clutch arrangement is reduced linearly.

In one particular embodiment of said method, it is advantageous if the torque which can be transmitted by the clutch arrangement is reduced in a pulsed fashion to reach the slip state.

A reproducible separation behaviour of the clutch can be obtained in this way.

It is also advantageous if the pressure applied to the clutch arrangement is increased after the slip state is reached such that the slip state is ended again.

In this way, the opening of the clutch arrangement from a closed state can be initiated in a precise fashion.

It is also advantageous if, here, the clutch pressure is raised from a previously defined slip level by a predefined value.

In this way, the slip state of the clutch arrangement can be ended quickly without it being necessary to measure the slip separately.

It is also preferable if the pressure applied to the clutch arrangement at which a previously defined slip level is reached, and the transmissible torque, are measured and stored as a value pair.

In this way, it is possible to generate a value pair for optimizing the clutch control.

It is also advantageous if the stored value pair is used for controlling the clutch arrangement during subsequent opening processes.

In this way, the slip state can be initiated more quickly and the clutch control can be optimized.

It is also preferable if the stored value pair is used for controlling a second clutch arrangement.

In this way, it is possible in multiple clutches, in particular in double clutches, for measured values to be exchanged between individual clutch arrangements.

It is also advantageous if the clutch arrangement has a wet-running clutch, since the clutch pressure of a wet-running clutch is easy to control.

In a further embodiment, it is advantageous for the clutch arrangement to be actuated by means of a hydraulic actuator. This represents a cost-effective and easily controllable variant of a clutch activation arrangement.

It is particularly preferable if, in an open state in which no torque can be transmitted by the clutch arrangement, a hydraulic internal pressure of the clutch arrangement is measured and is used as a reference pressure for the pressure applied to the clutch arrangement.

In this way, the clutch pressure can be set in a particularly precise manner even in the event of a fluctuating ambient pressure.

Said embodiment is considered to be a separate invention independently of the method for initiating an intermediate slip state.

It is also advantageous if the reference pressure is adapted in the closed state of the clutch arrangement corresponding to a varying outside pressure.

The reference pressure can thus be adapted to a varying outside pressure even when the clutch arrangement is closed.

It is self-evident that the features specified above and the features yet to be explained below can be used not only in the respectively specified combination but rather also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description, in which.

DETAILED DESCRIPTION OF THE INVENTION

Figure 1:
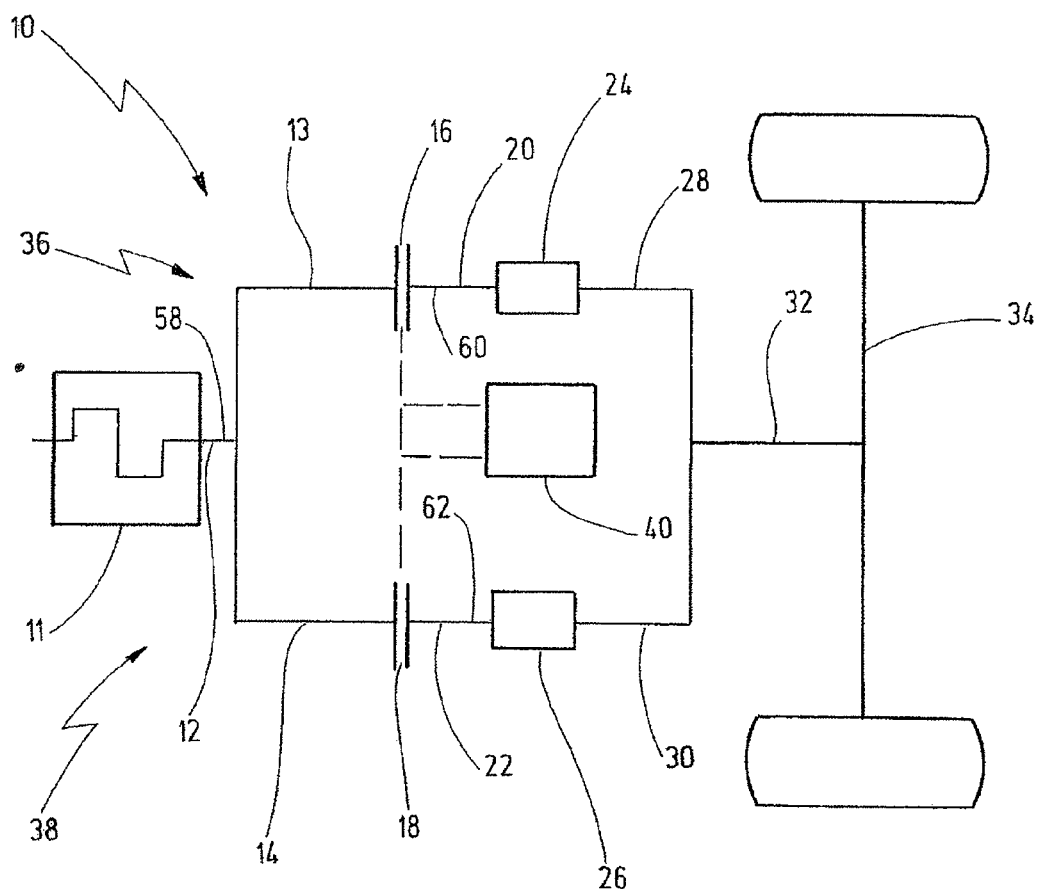
FIG. 1 shows a schematic illustration of a drivetrain for a motor vehicle for explaining the method according to the invention.

In FIG. 1, a drivetrain of a motor vehicle is denoted generally by 10.

The drivetrain 10 has a drive unit 11 with a drive output shaft 12. The drive output shaft 12 is connected to two input elements 13, 14 of two clutches 16, 18. Output elements of the clutches 16, 18 are connected in each case to transmission input shafts 20, 22 which connect the clutches 16, 18 in each case to one partial transmission 24, 26. The partial transmissions 24, 26 are connected in each case via a transmission drive output shaft 28, 30 to a cardan shaft 32 (or a single transmission output shaft). The cardan shaft 32 is preferably connected via a differential gear (not illustrated) to a driven axle 34. In this way, two parallel paths 36, 38 for power transmission are formed, in the manner of a dual-clutch transmission, between the drive output shaft 12 and the cardan shaft 32. The drivetrain 10 also has a control unit 40. The control unit 40 is connected via clutch actuators (not illustrated) to the clutches 16, 18.

In the schematically illustrated drivetrain 10, an engine torque which is generated by the drive unit 11 is transmitted to the drive output shaft 12. The engine torque is transmitted from the drive output shaft 12 to the clutches 16, 18. The clutches 16, 18, in the closed state in each case, connect the drive output shaft 12 to the transmission input shaft 20 and to the transmission input shaft 22 respectively in a non-positively-locking fashion. By means of the partial transmissions 24, 26, the engine torque which is applied to the transmission input shafts 20, 22 is transmitted, having been stepped down or stepped up, to the transmission drive output shafts 28, 30. The torque, which has been stepped up or stepped down in this way, of the transmission drive output shafts 28, 30 is transmitted by means of the cardan shaft 32 to the driven axle 34 in order to drive the motor vehicle.

The two clutches 16, 18 are controlled by the control unit 40 in such a way that basically only one of the two clutches 16, 18 is closed. The other of the two clutches 16, 18 is open. In this way, the engine torque is transmitted via one of the two paths 36, 38 depending on the activation of the clutches 16, 18. Conventionally, partial transmissions 24, 26 of said type have a plurality of gear stages (with one partial transmission having the even-numbered gear stages while the other partial transmission has the odd-numbered gear stages). Gearshifts can be carried out without an interruption in tractive force by overlapping actuation of the clutch 16, 18.

It is self-evident that the drivetrain 10 shown in FIG. 1 is a general schematic illustration, and therefore the individual elements are to be understood very generally. Accordingly, the clutches 16, 18 may be embodied either as dry friction clutches or as wet-running friction clutches. Furthermore, the illustrated drivetrain 10 is conceivable both for vehicles with one driven axle 34 and also for all-wheel-drive vehicles. Furthermore, the drivetrain could also be an automated manual shift transmission.

During a gearchange, a target gear stage is conventionally firstly engaged in that one of the partial transmissions 24, 26 which is connected to the open clutch 16, 18. The closed clutch of the clutches 16, 18 is subsequently opened. The open clutch of the two clutches 16, 18 is subsequently or simultaneously closed. The power flow is thus moved from one of the two paths 36, 38 to the other of the two paths 36, 38.

The clutches 16, 18 are opened by virtue of the torque which they can transmit being reduced until torque can no longer be transmitted. The transmissible torque is varied by changing a clutch pressure which is applied by a respective actuator.

The clutches 16, 18 are closed by virtue of the respective clutch pressure being raised until the associated clutch operates without slip. The clutch pressure is preferably subsequently increased slightly further (the clutch is over-pressured). Even in the event of high torque gradients, the clutch consequently does not pass into a slip state.

Figure 2:
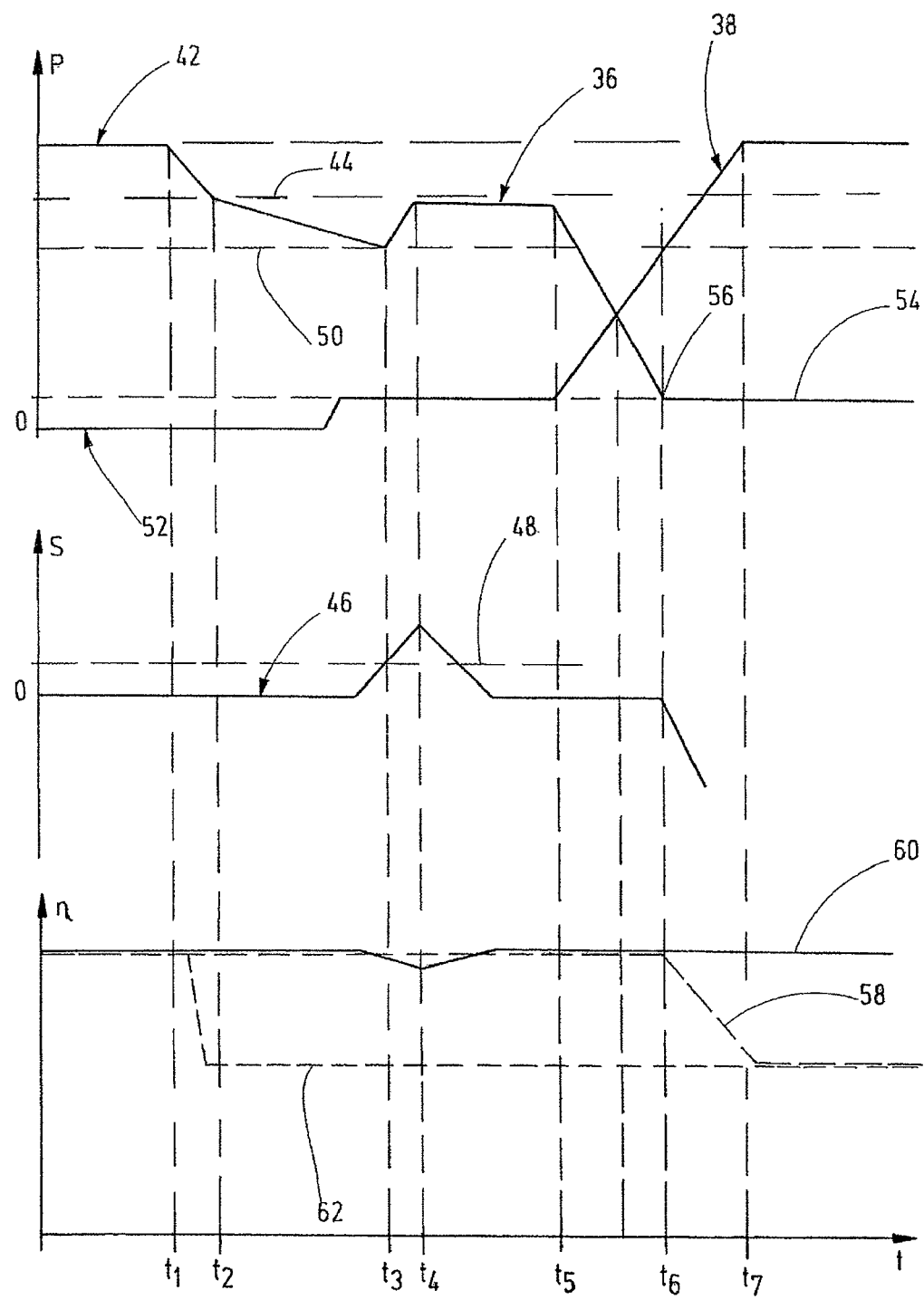
FIG. 2 shows a diagram, plotted against time, of a clutch pressure of two clutches, of a slip rotational speed, of two transmission rotational speeds and of an engine rotational speed of an embodiment of the method according to the invention.

FIG. 2 shows a diagram, plotted against time, which illustrates (from top to bottom) firstly a clutch pressure profile 42, 52 (P) of the clutches 16, 18 during a gearchange, a clutch slip 46 (S) of the opening clutch of the clutches 16, 18, and rotational speed profiles 60, 62, 58 (n) of the partial transmissions 24, 26 and of the drive unit 12 during a gearchange.

In FIG. 2, the power flow is transmitted firstly via the path 36, and by opening the clutch 16 and closing the clutch 18, the power flow is moved to the path 38.

The illustration of FIG. 2 proceeds from a state in which the clutch 16 is completely closed, as shown at 42, and the clutch 18 is completely open. In said state, the power flow runs via the path 36. The completely closed (over-pressured) state of the clutch 16 lasts until a time t1.

Upon a gearchange demand signal (at the time t1), which is for example triggered by the actuation of a shift lever in a manual shift mode or, in contrast, triggered independently by a transmission controller in an automatic mode, a fast reduction of the clutch pressure from the overpressure to a value shown at 44 firstly takes place up to a time t2. At said clutch pressure, the torque which can be transmitted by the clutch is still higher than the torque output by the drive unit 12.

From a time t2 onwards, the clutch pressure is conventionally reduced more slowly than it is up to the time t2, with a slip of the clutch being measured at the same time. The profile of the clutch slip of the clutch 16 is illustrated in FIG. 2 at 46. Here, the clutch slip increases as the clutch pressure 42 decreases beyond a certain time, until said clutch slip has reached a certain value, which is shown at 48, at the time t3. The time t3 at which the clutch 16 reaches the slip state 48 (or a predetermined slip level) is dependent on the engine torque. Up to the time t3, the torque which can be transmitted by the clutch 16 is preferably reduced to a value which is approximately 20 Nm below an adhesion limit of the clutch 16.

From the time t3 onwards, when the slip state 48 is measured, the clutch pressure 42 is not reduced further but rather is increased again in order to end the slip state 48 which has been attained. The slip state 48 conventionally corresponds to a rotational speed difference between the input element 13 and the transmission input shaft 20 of approximately 20 revolutions per minute. The increase in the clutch pressure 42 takes place up to the time t4. Since the clutch has a certain inertia, the slip firstly increases further after t3 and only later falls below the slip state 48 again. The increase in the clutch pressure 42 may take place until the measured clutch slip is ended, or else the clutch pressure 42 may be raised by a predefined value. As illustrated in FIG. 2, by means of an increase in the clutch pressure 42 from the time t4 onwards, the clutch slip 46 decreases again and, up to a time t5, is reduced to a value below the slip state 48, with the clutch slip 46 preferably being reduced to zero. At the time t5, the transmissible torque is preferably equal to the torque output by the drive unit 11. From the time t4 to the time t5, the clutch pressure of the clutch 16 is increased such that the torque which can be transmitted by the clutch 16 preferably rises by approximately 20 Nm. Said correction also serves to compensate for inaccuracies in the present engine torque. This is the optimum clutch pressure, in relation to the engine torque output by the drive unit 11, for initiating the opening of the clutch 16. The slip state which is intermediately generated beforehand is also referred to as semi-slip.

FIG. 2 also illustrates the clutch pressure of the clutch 18, which is initially fully open, as shown at 52. At a time between the time t1 and the time t3, the clutch 18 is prepared for being closed by virtue of the clutch pressure being increased slightly by a predefined value. Said preparation for closing the clutch corresponds, in one particular embodiment, to the filling of the clutch 18 or of the associated actuator with clutch oil (up to the engagement point or biting point of the clutch 18).

At the time t5, the simultaneous opening of the clutch 16 and closure of the clutch 18 are initiated. Here, the clutch pressure 42 of the clutch 16 is reduced preferably linearly to a level at which torque can no longer be transmitted, shown at 54. At the same time, the clutch pressure 52 of the clutch 16 is increased, up to a time t7, preferably linearly to a value which corresponds to an overpressure. At the time t6, the clutch 16 reaches an opening point 56 and the clutch 18 reaches a closing point at which the engine torque has been transferred entirely from the opening clutch 16 to the closing clutch 18.

Since, at the time t5, the clutch 16 is in a defined state and the clutch 18 is in the filled but open state, the opening point 56 and the closing point of the clutches 16, 18 can be run through precisely and simultaneously, as a result of which a harmonic transfer of torque is obtained during a gearchange.

After the overshooting of the opening point 56 at the time t6, the measured clutch slip 46 falls to a negative value, since the open clutch 16 can then no longer transmit torque.

The torque profiles of the drive output shaft 12, of the transmission input shaft 20 and of the transmission input shaft 22 are likewise illustrated in FIG. 2, and are denoted in each case correspondingly by 58, 60 and 62. Up to the time t1, the rotational speeds 58, 60 and 62 of the drive output shaft 12 and of the transmission input shafts 20, 22 are identical. Between the times t1 and t2, a gear stage is engaged in that partial transmission 26 which is assigned to the open clutch. As a result, the rotational speed 62 of the transmission input shaft 22 changes. Up to the time t6, the rotational speeds 58, 60 are substantially identical with the exception of a period of time before and after the time t4 in which, as described above, the clutch 16 is intermediately placed in slip, and a rotational speed difference therefore occurs between the drive output shaft 12 and the transmission input shaft 20. After the time t6, when the clutch 16 is opened and the clutch 18 is closed, the rotational speed 58 of the drive output shaft 12 falls from the rotational speed 60 of the transmission input shaft 20 to the rotational speed 62 of the transmission input shaft 22, since at said time t7, the power flow is transmitted via the path 38.

At the time t7, the clutch 18 is in an over-pressured state, and the clutch 16 is open.

In the process illustrated in FIG. 2 for opening one of the clutches 16, 18, the clutch pressure is measured at the time t3, when the clutch to be opened passes into the slip state 48, and is set in relation to a torque which can be transmitted by the clutch 16, 18. Said correlating values are measured and stored as a value pair. The control of the clutch 16, 18 can be optimized on the basis of said measured and stored value pair in such a manner that, firstly, the clutch pressure is reduced more quickly from the state of over-pressure 42 to the clutch pressure 44, such that in general, the process up to the opening of the clutch can be carried out more quickly.

Said measured clutch pressure in relation to the torque which can be transmitted by the clutch may be used both for subsequent opening processes of the same clutch 16, 18 and also for opening processes of the other clutch 16, 18. In this way, it is possible on the basis of the measured values to continuously optimize the control for opening and closing the clutches. The measured clutch pressure in relation to the transmissible torque may be dependent on the engaged gear stage. It is therefore preferable if the measured values are also adapted to the engaged gear stage.

The measured value pair composed of the transmissible torque and the clutch pressure may be subjected to a plausibility check and correspondingly stored and used or discarded.

The value pair may also be used for controlling the clutch 18 during subsequent opening processes. Here, however, it should be noted that the clutches 16, 18 may behave differently in terms of their torque behaviour.

It is also possible for the value pairs which have been measured at the two clutches 16, 18 to be combined with one another in order to utilize these for a present control process. Here, it may be advantageous if corrective values for the individual clutches 16, 18 are determined, and a difference of the individual corrective values is utilized for controlling the present control process.

Figure 3:
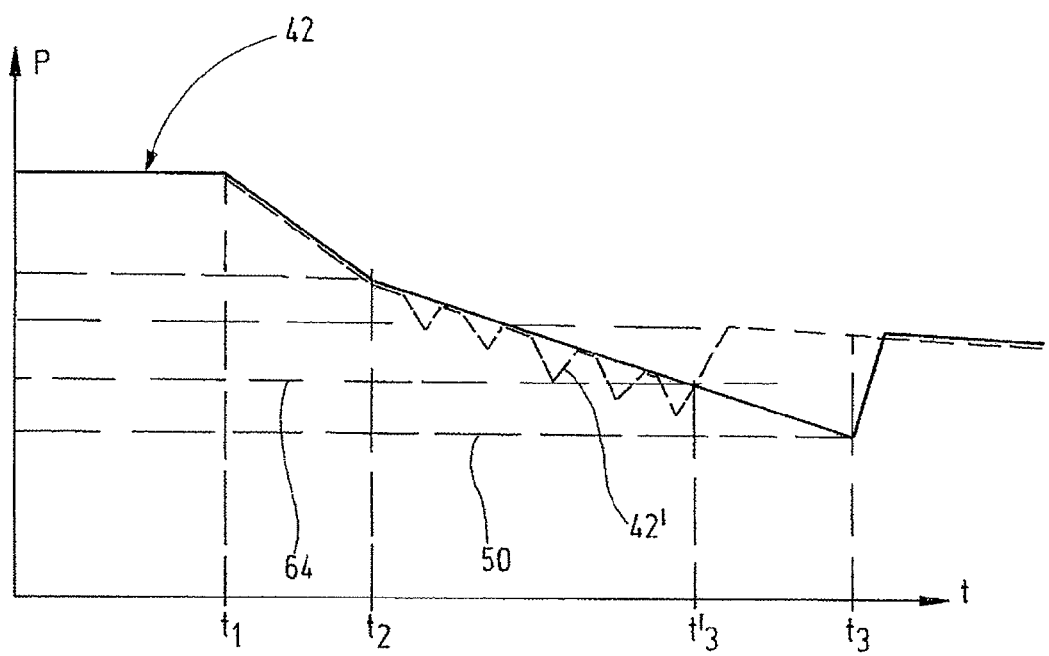
FIG. 3 shows a diagram, plotted against time, of the clutch pressure according to one particular embodiment of the method according to the invention.

FIG. 3 shows a special embodiment of a clutch pressure profile P of the clutch 16 to be opened of the method according to the invention. Here, the clutch pressure profile 42 from FIG. 2 is illustrated as a solid line, and the special embodiment is illustrated as a dashed line 42'.

The pressure profile is initially identical to the profile from FIG. 2 up to the time t2. At the time t2, as illustrated in FIG. 2, the clutch pressure is reduced more slowly in order to reach the slip state. In contrast to FIG. 2, the profile which is illustrated here by a dashed line decreases not rectilinearly but rather in a pulsed fashion. Said pulsed profile is generated by the superposition of the ramp-shaped rectilinear profile from FIG. 2 with a zig-zag function. In this way, the intermediate slip state can be brought about more quickly. The slip state is consequently already reached at a time t3' which precedes the time t3 in FIG. 2. The clutch pressure is not reduced as far, such that proceeding from a clutch pressure 64 which is greater than the corresponding value 50 of FIG. 2, the pressure can be increased again in order to end the intermediate slip state again. The subsequent profile of the clutch pressure is identical to that illustrated in FIG. 2.

Clutches generally tend to stick or build static friction. The clutch pressure which fluctuates in this way has the effect that the intermediate slip state can be reached in a reproducible fashion and earlier since the static friction is overcome earlier as a result of the fluctuating clutch pressure. In this way, the clutch pressure need not be reduced so far, and the slip state can be attained at a higher clutch pressure. Furthermore, the clutch pressure may be increased by a lesser value at the time t3' in order to end the slip state again.

The profile of the clutch pressure is not restricted to the form illustrated in FIG. 3. The function which is superposed on the rectilinear ramp function may be configured as a sinusoidal function, as a sawtooth function, as a pulse sequence or the like.

The method illustrated in FIGS. 2 and 3 may generally be used both for wet-running friction clutches 16, 18 and also for dry friction clutches which can be operated both by means of hydraulic actuators and also by means of electromotive actuators.

Figure 4:
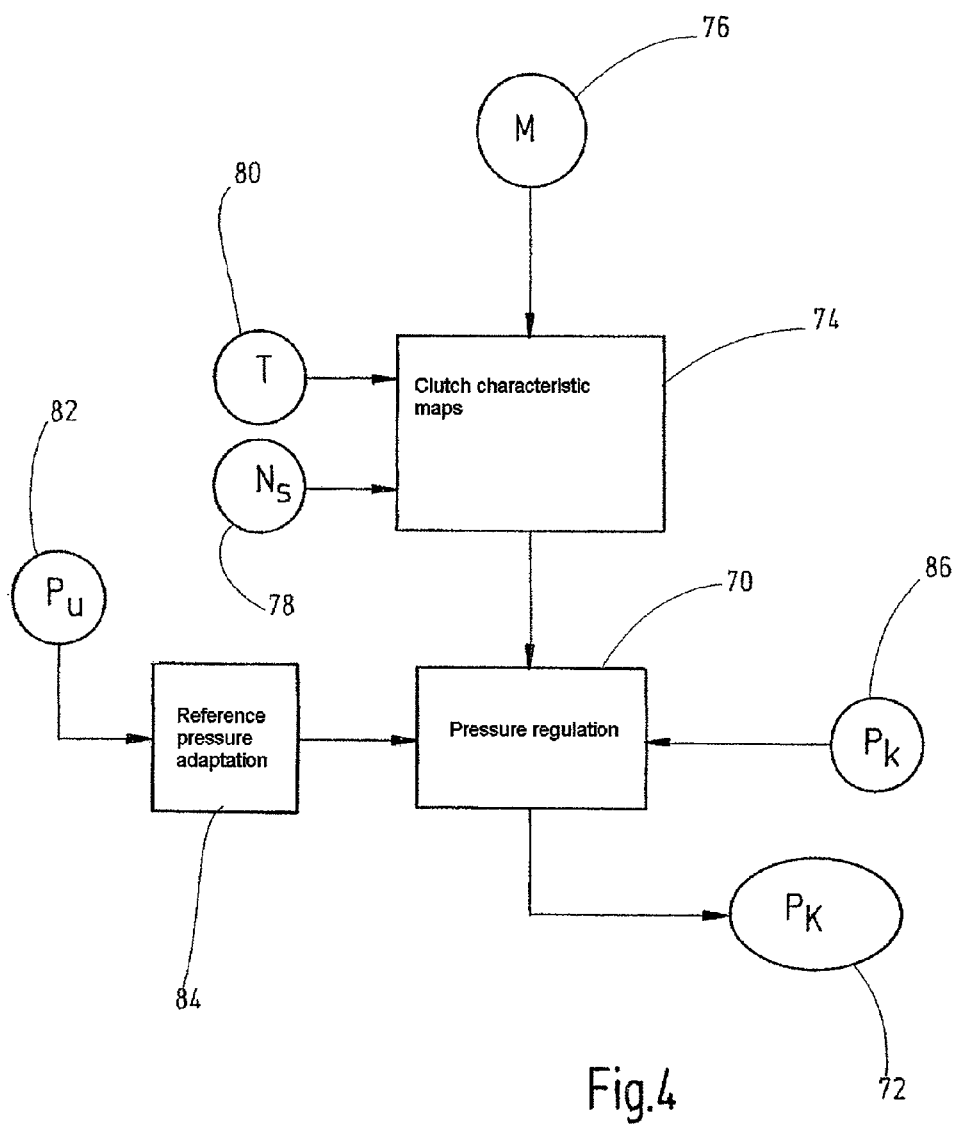
FIG. 4 shows a possible circuit diagram for explaining the pressure regulation of the clutch pressure.

FIG. 4 schematically illustrates a possible circuit diagram for the pressure regulation of the clutch pressure.

The function for pressure regulation 70 illustrated in FIG. 4 has various input variables and outputs the clutch pressure 72 as an actuating variable. The measurement variables of engine torque 76, slip rotational speed 78 and clutch temperature 80 are evaluated by means of clutch characteristic maps 74 and are provided to the pressure regulation 70. Furthermore, an ambient pressure 82 is measured which serves as a measurement variable for a reference pressure adaptation 84, with the reference pressure adaptation 84 outputting a value which serves as an input variable of the pressure regulation 70. Furthermore, a measured clutch internal pressure 86 is one of the input variables of the pressure regulating function 70.

The reference pressure adaptation 84 determines a reference pressure for regulating the clutch pressure corresponding to a measured ambient pressure 82 in order to be able to optimally regulate the clutch pressure even in the event of a fluctuating ambient pressure 82.

Said reference pressure is usually measured when the clutch 16, 18 is fully open and serves as a zero point. In the case of a wet-running clutch 16, 18, said reference pressure 86 is measured in the interior of the clutches 16, 18, and in the case of friction clutches which are actuated by means of hydraulic actuators, the reference pressure is measured in the interior of the actuators. The open clutch 16, 18 is usually acted on with a residual pressure such that the hydraulics remain in a filled state. Said zero point is conventionally approximately 0.4 bar. During relatively long periods of driving without a gearchange, however, the clutch 16, 18 remains closed over a relatively long period of time, and the reference pressure cannot be measured for a relatively long time. In particular situations, for example in the event of relatively large changes in altitude being overcome without changing gear, the defined reference pressure may, on account of the changed ambient pressure 82, lead to faulty pressure regulation 70. To compensate such ambient pressure fluctuations, the ambient pressure 82 is measured continuously. The reference pressure is adapted, by means of the reference pressure adaptation 84, to a varying ambient pressure 82, such that even in such cases the pressure regulation 70 can be carried out in a precise manner. The ambient pressure may be measured by a special pressure sensor or provided by an existing sensor for some other application, such as for example of an engine control unit.

The reference pressure adaptation 84 is usually started when an inactive partial transmission 24, 26 is flushed. This usually takes place at a time interval of approximately 30 seconds. For this purpose, a so-called cut-off valve is opened and a certain time is allowed to elapse until associated hydraulic lines have emptied.

The clutch pressure 72 is thereafter measured, evaluated and prepared by means of a time-dependent filter constant.

If the pressure measurement yields a clutch pressure 72 above a predefined value, for example 1.2 bar, an entry may be made into a fault memory, and the partial transmission blocked.

Furthermore, it is also advantageous for the reference pressure adaptation to be carried out at different speeds.

By means of the clutch characteristic maps 74, the measured variables of engine torque 76, slip rotational speed 78 and clutch temperature 80 are set in relation or evaluated, and the pressure regulation 70 is provided in this way. Here, it is conceivable for the clutch characteristic maps 74 to be adapted on the basis of the measured measurement variables in relation to the applied clutch pressure 72 or the measured clutch pressure 86 or the value pair composed of clutch pressure 72 and transmissible engine torque. It is also conceivable for different clutch characteristic maps 74 to be used as a function of the engaged gear stage.

What is claimed is:

1. Method for opening a closed clutch arrangement of a drivetrain for a motor vehicle, wherein the clutch arrangement is activated in such a way that a torque which it can transmit is reduced up to an opening point at which torque can no longer be transmitted via the clutch arrangement, and wherein the clutch arrangement is placed into an intermediate slip state before the opening point is reached, wherein the torque which can be transmitted by the clutch arrangement is reduced in a pulsed fashion to reach the slip state.

2. Method according to claim 1, wherein the torque which can be transmitted by the clutch arrangement is reduced linearly to reach the slip state.

3. Method for opening a closed clutch arrangement of a drivetrain for a motor vehicle, wherein the clutch arrangement is activated in such a way that a torque which it can transmit is reduced up to an opening point at which torque can no longer be transmitted via the clutch arrangement, and wherein the clutch arrangement is placed into an intermediate slip state before the opening point is reached, wherein the pressure applied to the clutch arrangement is increased after the slip state is reached such that the slip state is ended again, wherein the pressure applied to the clutch arrangement at which the slip state is ended, and the transmissible torque, are measured and stored as a value pair, and wherein the stored value pair is used for controlling the clutch arrangement during subsequent opening processes, wherein the stored value pair is used for controlling a second clutch arrangement.

4. Method according to claim 3, wherein the clutch pressure is raised by a predefined value.

5. Method for opening a closed clutch arrangement of a drivetrain for a motor vehicle, wherein the clutch arrangement is activated in such a way that the torque which it can transmit is reduced up to an opening point at which torque can no longer be transmitted via the clutch arrangement, wherein the clutch arrangement has a wet-running clutch, and wherein, in an open state in which no torque can be transmitted by the clutch arrangement, a hydraulic internal pressure of the clutch arrangement is measured and is used as a reference pressure for a pressure applied to the clutch arrangement.

6. Method according to claim 5, wherein the reference pressure is adapted in the closed state of the clutch arrangement corresponding to a varying outside pressure.

7. Method for opening a closed clutch arrangement of a drivetrain for a motor vehicle, wherein the clutch arrangement is activated in such a way that the torque which it can transmit is reduced up to an opening point at which torque can no longer be transmitted via the clutch arrangement, and wherein the clutch arrangement is placed into an intermediate slip state before the opening point is reached, wherein the pressure applied to the clutch arrangement is increased after the slip state is reached such that the slip state is ended again, wherein the pressure applied to the clutch arrangement at which the slip state is ended, and the transmissible torque, are measured and stored as a value pair, wherein the stored value pair is used for controlling a second clutch arrangement.

8. Method according to claim 7, wherein the clutch pressure is raised by a predefined value.

9. Method according to claim 7, wherein the stored value pair is used for controlling the clutch arrangement during subsequent opening processes.

10. Method for opening a closed clutch arrangement of a drivetrain for a motor vehicle, wherein the clutch arrangement is activated in such a way that the torque which it can transmit is reduced up to an opening point at which torque can no longer be transmitted via the clutch arrangement, and wherein the clutch arrangement is placed into an intermediate slip state before the opening point is reached, wherein the clutch arrangement has a wet-running clutch, wherein, in an open state in which no torque can be transmitted by the clutch arrangement, a hydraulic internal pressure of the clutch arrangement is measured and is used as a reference pressure for a pressure applied to the clutch arrangement.

11. Method according to claim 10, wherein the clutch arrangement is actuated by means of a hydraulic actuator.

12. Method according to claim 10, wherein the reference pressure is adapted in the closed state of the clutch arrangement corresponding to a varying outside pressure.

* * * * *